United States Patent
Clusserath

(10) Patent No.: US 8,580,193 B2
(45) Date of Patent: Nov. 12, 2013

(54) METHOD AND DEVICE FOR PASTEURIZING A LIQUID PRODUCT

(71) Applicant: KHS GmbH, Dortmund (DE)

(72) Inventor: Ludwig Clusserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/748,726

(22) Filed: Jan. 24, 2013

(65) Prior Publication Data

US 2013/0177678 A1 Jul. 11, 2013

Related U.S. Application Data

(62) Division of application No. 12/999,298, filed as application No. PCT/EP2009/004539 on Jun. 24, 2009.

(30) Foreign Application Priority Data

Jul. 4, 2008 (DE) .......................... 10 2008 031 368

(51) Int. Cl.
  *A61L 2/04* (2006.01)
(52) U.S. Cl.
  USPC ............................................. 422/38; 422/307
(58) Field of Classification Search
  USPC ..................................... 422/307, 38
  See application file for complete search history.

(56) References Cited

U.S. PATENT DOCUMENTS 1,819,023 A * 8/1931 Grindrod ....................... 426/476
6,095,178 A * 8/2000 Gilbert et al. .................. 137/199

FOREIGN PATENT DOCUMENTS

| AT | 404421 | * 11/1998 | ................ A23L 3/16 |
|----|--------|-----------|---------------------------|
| AU | 404421 | 11/1998 | |
| DE | 100 18 741 C1 | 8/2001 | |
| EP | 0 567 913 | 11/1993 | |
| WO | 91/15128 | 10/1991 | |
| WO | 00/67598 | 11/2000 | |
| WO | WO 00/67598 | * 11/2000 | ................ A23L 3/22 |
| WO | 2004/066756 | 8/2004 | |

OTHER PUBLICATIONS

English machine translation of Prugner. AT 404421. Nov. 1998.*
English machine translation of Till. WO 00/67598. Nov. 2000.*

* cited by examiner

*Primary Examiner* — Sean E Conley
*Assistant Examiner* — Donald Spamer
(74) *Attorney, Agent, or Firm* — Occhiuti Rohlicek & Tsao LLP

(57) ABSTRACT

A method for pasteurizing a liquid product includes heating the liquid product to a pasteurization temperature, thereby killing micro-organisms, keeping it in a treatment chamber at the pasteurization temperature for a holding period, regulating a length of the treatment station based at least in part on its flow-rate, regulating a product volume within the treatment chamber by changing a level of a liquid product surface in the treatment chamber through, for example, addition and removal of sterile gas or vapor-forming medium in a partial chamber of the treatment chamber formed above the product surface, or changing a level of a product outlet in the treatment chamber.

7 Claims, 2 Drawing Sheets

METHOD AND DEVICE FOR PASTEURIZING A LIQUID PRODUCT

CROSS-REFERENCE TO RELATED APPLICATIONS

Figure 1:
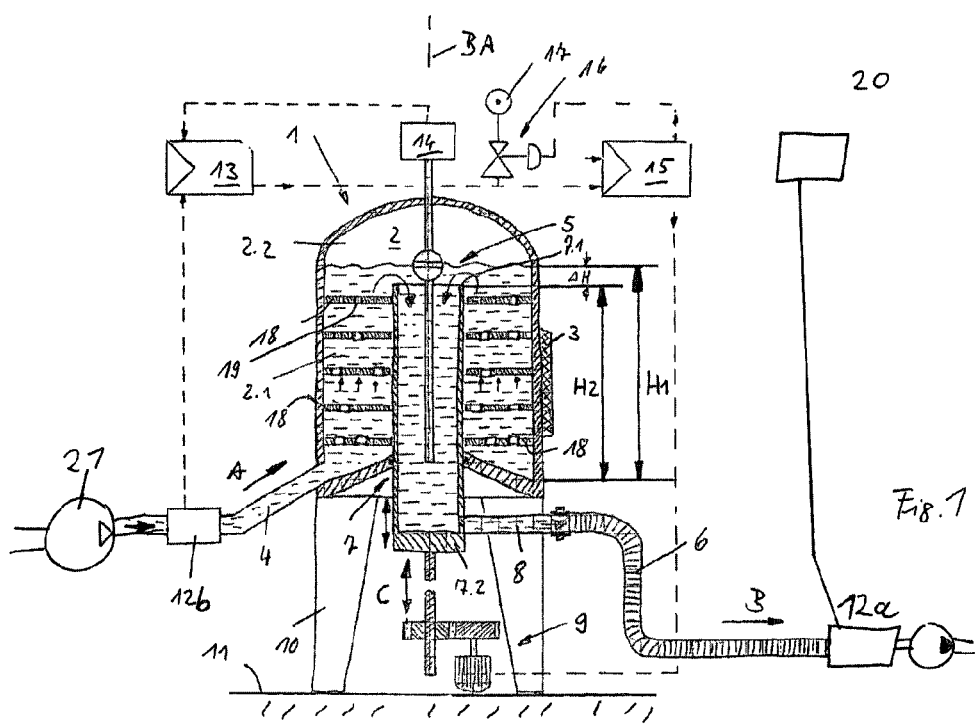

Under 35 USC 120, this application is a divisional of and claims the benefit of the priority date of pending U.S. application Ser. No. 12/999,298, filed on Dec. 15, 2010, which is a National Stage of International Application No. PCT/EP2009/004539, filed on Jun. 24, 2009, which claims the benefit of German Application Serial No. 10 2008 031 368.8 filed on Jul. 4, 2008. The contents of both of the foregoing applications are hereby incorporated by reference in their entirety.

The invention relates to a method for pasteurizing a liquid product.

The pasteurizing of products, and in this case in particular beverages or other foodstuffs, for effectively killing off germs and/or micro organisms harmful to products, is known. In this case, the respective product is heated to a pasteurization temperature, for example within the range of 70 to 80°, preferably within the range of 72 to 75°, and is held for the duration of a treatment period, which can also be called a required heat holding period, at the pasteurization temperature, such that, among other things, the germs and/or micro organisms that are harmful to products are effectively killed off as required during said treatment or heat holding time. After the treatment, the product is cooled back down and can then be supplied as a sterile product to a further treatment, for example to a filling machine to be filled into bottles or similar containers.

In the case of conventional pasteurization systems known to date, the necessary heat holding time at constant product throughput of the product to be pasteurized is achieved by establishing a corresponding tubular section in which the pasteurization temperature is maintained. A disadvantage in this case is, however, that the actual treatment or heat holding time alters in dependence on the product throughput, i.e. on the flow rate of the product per unit time (for example in $m^3/h$) and, consequently, a system has to be designed such that the necessary required heat holding time is still maintained even with the largest possible product throughput. In the case of smaller product throughputs, this leads forcibly to a considerable extension to the treatment or heat holding time, i.e. to over-pasteurization and consequently to a considerable strain and to a considerable impairment of the quality of the respective product.

Changes to the product throughput can be caused by various reasons, for example such changes are caused by a change in the performance of a filling machine connected downstream of the pasteurization system or are also caused by the fact that containers of different types and sizes for different products are processed by one and the same system etc.

Attempts have already been made to equalize changes in the product throughput by interposing buffer storage between the pasteurization system and a filling machine connected downstream and to counter over-pasteurization; these attempts, however, have only had very restricted success in practice, among other things because it has not been possible to increase the volume of the buffer storage arbitrarily for reasons of economy and space.

It is the object of the invention to provide a method by means of which it is possible to prevent over-pasteurization and under-pasteurization even where there are considerable changes to the product throughput.

The knowledge underlying the invention is that over-pasteurization can be effectively prevented simply by controlling or regulating the product volume within the treatment chamber, or however also by, in a supplementary or exclusive manner, controlling or regulating the length of the treatment section, which is run through by the product during and for pasteurization.

It is particularly significant in this case to be able to control or regulate the product volumes located in the pasteurization process in dependence on the product throughput, that is the amount of liquid product accepted by the filling machine per unit time, in order to maintain the required heat holding time in an optimum manner.

In the case of a preferred embodiment of the invention, the control or regulating of the pasteurization process is effected by the amount of the product located in the pasteurization container being adjusted; it being particularly important when the length of the treatment section is also adjusted corresponding to the product throughput of the filling machine per unit time. Finally, the invention proposes a pasteurizer for liquid products, the output of which can be modified.

Further developments, advantages and applications of the invention are produced from the following description of exemplary embodiments and from the Figures. In this case, all features described and/or graphically represented are objects of the invention, either individually or combined, irrespective of their summary in the claims or their dependency. The content of the claims is also made a component of the description.

Figure 2:
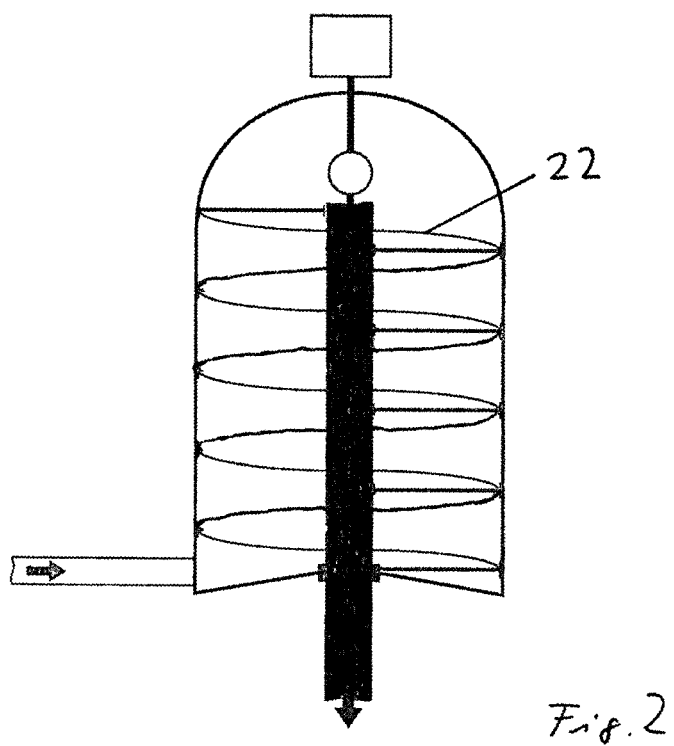

The invention is described below by way of the Figure of an exemplary embodiment, in which, in detail:

FIG. 1 shows a cross section of an exemplary embodiment of a pasteurization system according to the invention, and FIG. 2 shows a particularly advantageous development of a helical guide element.

FIG. 1 shows a schematic, sectional representation of the pasteurization container of a pasteurization system for pasteurizing a liquid product, for example a beverage. The container 1, in the embodiment represented, is realized with a cylindrical peripheral wall 1.1 that defines a container interior 2 and surrounds a vertical container axis BA, a container cover 1.2 that closes the container interior 2 at the top side in a sealing manner and is concavely curved on the container inside and a container bottom 1.3 that closes the container interior 2 at the container underside and, in the embodiment represented with reference to the container axis BA, is formed in the manner of a cone ring, with the convex inner side facing the container interior 2.

On the outside surface, the container 1 is preferably provided with suitable thermal insulation 3 in order, with a small amount of energy input, to maintain the temperature necessary for the pasteurization in the container interior 2.

The product to be pasteurized is continuously supplied to the container 1 or a container or product inlet from a heater (not shown) via a line 4 corresponding to the arrow A in the region of the container bottom 1.3. After a sufficient required heat holding time, the pasteurized product is supplied via a product outlet, given the general reference 5 in the Figure, and an at least partially flexible line 6 connected thereto corresponding to the arrow B, to a further treatment, namely a cooler and then to a filling machine. A buffer tank is provided between the product outlet and the provided filling machine in particularly advantageous embodiments.

The pipe 7 is adjustable in the container axis BA (double arrow C) by means of a setting drive 9, which, for example, is a spindle drive with an electric motor or a hydraulic lifting system etc. In this case, it is particularly significant that the pipe 7, by way of its outside wall, closes the central opening located inside the separating plates 18 in a substantially sealing manner, and consequently determining the length of the product path. If the pipe 7 is in a bottom position, immediately after flowing through, the product passes along a relatively short flow path into the product outlet 5. In this position, a relatively small amount of product is situated within the pasteurization container 1. This position is to be selected for a small product throughput per unit time. If, contrary to this, the pipe 7 is in the top position, a long treatment section is set, and there is a large product volume in the pasteurization container 1. This position is to be selected for a large product throughput per unit time.

In order to create the necessary space for the movement of the pipe 7 in the container axis B1 and for accommodating the setting drive 9, the container 1 is provided with foot elements 10 on the underside, by means of which foot elements said container stands upright on a sub surface 11, the container 1.3 being at a spacing from said sub surface 11.

During operation, the container interior 2 is partially filled with the hot product, up to a height level corresponding to the height H1, such that in the container there is a product space 2.1 occupied by the product and above this a gas space 2.2 not occupied by the product. The gas space 2.2 formed above said height level H1 is filled with a sterile gaseous and/or vaporous medium, for example nitrogen or an inert gas, and is preferably pressurized at pressure P1.

The outlet 5, in the case of the embodiment represented, is formed by a pipe 7 that is located on the identical axis as the container axis BA and is guided through the container bottom 1.3, said pipe being open at its top end 7.1 that is located in the container interior 2 and closed at its bottom end 7.2 that is guided out of the container interior 2 and is located below the container bottom 3.1. In the region of the bottom end 7.2, the pipe 7 is provided with a connection piece 8, to which the line 6 is connected. The passage of the outlet 5 or of the pipe 7 forming said outlet through the container bottom 1.3 is sealed in a suitable manner. From a microbiological view, there is no danger of contamination of the product in the region of this lead-through as the temperature of the product in the interior of the container 1 is that necessary for effective pasteurizing. However, additional safeguards, for example vapour traps, are possible in principle.

In order to be able to achieve the desired killing off of micro organisms and/or germs that are harmful to the product in a reliable manner by the pasteurization process, the product, as known, must be held for a certain time at the pasteurization temperature. As the necessary application time is independent of the product throughput to be pasteurized per unit time, where there is a large product throughput per unit time more product has to be situated in the pasteurizer than where the product throughput per unit time is small. Consequently, the proposal according to the invention is to control or regulate the product amount located in the pasteurization container 1 in dependence on the product throughput per unit time.

However, where pasteurizers included in the prior art are used, where a preferably dynamic adaptation of the length of the treatment section is unknown, mere modification of the product amount located in the pasteurization container 1 in dependence on the product throughput per unit time, leads to unsatisfactory results.

For example, if there is a larger, freely moveable product volume inside a pasteurizer for which no mandatory flow path to be adhered to is predetermined, there is a permanent danger that at least a part volume of the product to be pasteurized passes directly from its inlet into the pasteurizer to the product outlet 5, said part volume in such a case not being pasteurized in the necessary manner. On account of the disadvantages and dangers connected hereto, such a possibility must be excluded in a reliable manner.

The present invention provides a remedy and improvement in this case too, proposing a pasteurization container 1 with a treatment section with a variable length.

For example, the product volume contained in the container interior 2 is initially regulated in dependence on the product throughput through the container 1, i.e. in dependence on the product volume ($m^3/h$) supplied to the container per unit time and/or discharged from the container per unit time. Regulation is effected in this case such that when there is a reduction in the product throughput, the volume of the part space 2.1 occupied by the product in the container 1 is also reduced and where the product throughput is increased, said volume is also increased.

In a preferred embodiment of the present invention, regulation is effected, for example, in such a manner that the regulation is effected in dependence on the product throughput of the filling machine.

However, adaptation of the product amount can also be effected as a consequence of the control signals of a system controlling means that is higher-level than the filling machine.

If, for example, a sinking fill level within the buffer tank connected upstream of the filling machine or also a flow measuring device 12a located in the product line signals a greater or an increasing product throughput of the filling machine, the amount of the product located in the pasteurization chamber 1 must also be increased. To this end, for example, a computer, which, among other things, processes the signals of the flow measuring device 12a, takes suitable measures to increase the amount of the product within the pasteurization chamber, for example by actuating a supplying pump 21.

In an additional embodiment of the present invention, regulating the height level H1 is effected by correspondingly supplying or discharging the sterile gaseous and/or vaporous medium to/from the gas space 2.2 in a closed loop. To this end, a flow measuring device 12b is provided in the line 4, for example a magnetically inductive flow measuring device, the output signal of which is supplied to a regulating means 13. An additional input of the regulating device 13 is connected to a sensor 14 that detects the actual height level H1 of the product fill level in the container 1. The output of the regulating means 13 is connected to an input of another regulating means 15, which controls or regulates the height level H1, in dependence on control and regulating parameters stored in said regulating means, and consequently the volume of the part space 2.1 occupied by the product and on the other hand also the charging of the outlet 5 or of the pipe 7, i.e. the height level H2. The regulating means 15 is connected by way of an output to the setting drive 9 for this purpose.

In addition, it can be provided that an additional output of the regulating means 15 is connected to a control valve arrangement 16, by means of which sterile gas or sterile gaseous and/or vaporous medium can be introduced in a controlled manner from a source 17 or a line conducting said gaseous and/or vaporous medium into the part space 2.2 or can be blown out of said part space 2.2 into the atmosphere, for example via a filter. The height level H1 corresponding to the respective throughput measured by the flow measuring device, the level H2 corresponding to the respective height level H1 or the level difference ΔH and product-specific and/or system-specific parameters etc are stored in the regulating means 15, for example, as control or regulating parameters, such that the necessary regulating of the product volume in the container 1 or of the height level H1 and the corresponding charging of the height level H2 to maintain the required heat holding time can be achieved with consideration to such parameters in an independent optimum manner in a closed loop system.

In order to prevent a direct product flow, not maintaining the required heat holding time, being formed within the part space 2.1 from the line 4 or from the bottom product inlet formed by said line to the upper outlet 5 or to the pipe end 7.2, a plurality of baffles are provided in the part space 2.1, said baffles having to be traversed by the product and in particular causing a certain turbulence of the product in the part space 2.1. In the case of the embodiment represented, these baffles are formed by separating plates 18, which divide the part space 2.1 into a plurality of individual spaces located one above another in the direction of the container axis BA. The separating plates 18 are each provided with a multitude of openings 19 for the product, preferably in such a manner that the openings 19 of adjacent separating plates 18 are offset radially in a staggered manner in relation to the container axis BA. Other baffles are also conceivable, e.g. in the form of at least one helical guide element 22 for realizing a helical treatment section, as can be seen in FIG. 2.

Other baffles preventing a direct product flow from the line 4 to the outlet 5 can also be provided in place of the separating plates 18.

The length of the product line is also adapted according to the invention in dependence on the product throughput.

To this end, the embodiment already described above is initially provided with a pipe 7, the height position of which is adjustable, the outside wall of the pipe 7 establishing the length of the treatment section in conjunction with the separating plates 18.

In an additional embodiment that is not shown, it is provided that the pipe 7 is stationary, that is not vertically adjustable. To change the length of the treatment section, various openings are provided at different height levels on the outside wall of the pipe 7, it preferably being possible to open and close said openings independently of each other. Through the targeted opening of an opening, the treatment section can be adjusted to the desired length. It is especially advantageous in the case of this embodiment for the pipe 7 to be able to be connected in a flow-sealed manner to the separating plates 18, or even to the helical guide element 22 such that unwanted transverse flows of the product are reliably avoided.

Through the method described, i.e. by controlling the volume within the container 1 and/or controlling the length of the treatment section in dependence on the product throughput, the pasteurization temperature and in particular also the heat holding time are therefore held at optimum values for an effective killing off of micro organisms and/or germs that are harmful to the product or beverage. An excessive over-pasteurization impairing the product quality is reliably avoided. An additional considerable advantage is that buffer tanks for intermediate buffering of the sterile product between the pasteurization system and a filling machine connected downstream are no longer required.

The invention has been described above by way of an exemplary embodiment. It is obvious that changes and conversions are possible without in any way departing from the inventive concept underlying the invention.

Thus, it has been assumed above that to regulate the product volume or the length of the product line, and to regulate or charge the height level H2 of the product outlet 5, two regulating means 13 and 15 are provided. The functions of said regulating means can obviously also be combined in one single regulating means or in one single control device that is, for example, microprocessor-controlled or computer-controlled or the function of the two regulating means 13 and 15 can also be realized, for example, in process control, e.g. at least partially by means of software, said process control controlling or regulating an overall system that includes the pasteurization system that comprises the heater (not shown) and the pasteurization container 1.

It has been assumed above that for regulating the volume of the part space 2.1 or of the product within the container 1, the height level H1 is altered and the height level H2 or the height difference $\Delta H$ is charged. It is basically also possible, in principle, to regulate the height level H2 of the outlet 5 in dependence on the throughput of the product and to charge the height level H1 to maintain the level or height difference $\Delta H$.

LIST OF REFERENCES

1 Pasteurization system
2 Container interior
2.1, 2.2 Part space
3 Thermal insulation
4 Product line
5 Product outlet
6 Product line
7 Pipe
7.1, 7.2 Pipe ends
8 Connection piece
9 Setting drive
10 Foot element
11 Sub structure
12a, b Flow measuring device
13 Regulating means
14 Level sensor
15 Regulating means
16 Control valve arrangement
17 Source for sterile gas
18 Separating plate
19 Opening
20 Computer
21 Supplying pump
22 Helical guide element
A, B Product flow
C Adjusting travel of the outlet 5
H1, H2 Height level
$\Delta H$ Height difference
BA Vertical container axis

The invention claimed is:

1. A method for pasteurizing a liquid product, said method comprising heating said liquid product to a pasteurization temperature, thereby killing off at least one of micro-organisms and germs harming said product, keeping said product in a treatment chamber at said pasteurization temperature for a holding period, regulating a length of a product path based at least in part on a flow-rate of said liquid product, regulating a product volume within said treatment chamber by changing a level of a liquid product surface in said treatment chamber through at least one of addition of at least one of a sterile gas and a vapor-forming medium in a partial chamber of said treatment chamber formed above said product surface, removal of at least one of a sterile gas and a vapor-forming medium in a partial chamber of said treatment chamber formed above said product surface, and by changing a level of a product outlet in said treatment chamber.

2. The method of claim 1, further comprising locating said product path in an interior of a pasteurization container.

3. The method of claim 1, further comprising maintaining said holding period independently of said flow-rate by controlling a volume of said product within said treatment chamber based at least in part on said product flow-rate.

4. The method of claim 1, further comprising controlling a volume of said product in said treatment chamber at least in part based on a product flow rate at one of an intake and said outlet.

5. The method of claim 1, wherein regulating said product volume within said treatment chamber comprises regulating said product volume based at least in part on parameters specific to at least one of said liquid product and a pasteurization system being used to pasteurize said liquid product.

6. The method of claim 1, further comprising selecting said liquid product to be a food product.

7. The method of claim 1, further comprising selecting said liquid product to be a beverage.

* * * * *